Aug. 17, 1954     C. A. FAUSEL     2,686,683
QUICK-CHANGE ARBOR

Filed Feb. 8, 1952     2 Sheets-Sheet 1

INVENTOR
C. A. FAUSEL
BY
ATTORNEY

Aug. 17, 1954 C. A. FAUSEL 2,686,683
QUICK-CHANGE ARBOR
Filed Feb. 8, 1952 2 Sheets-Sheet 2
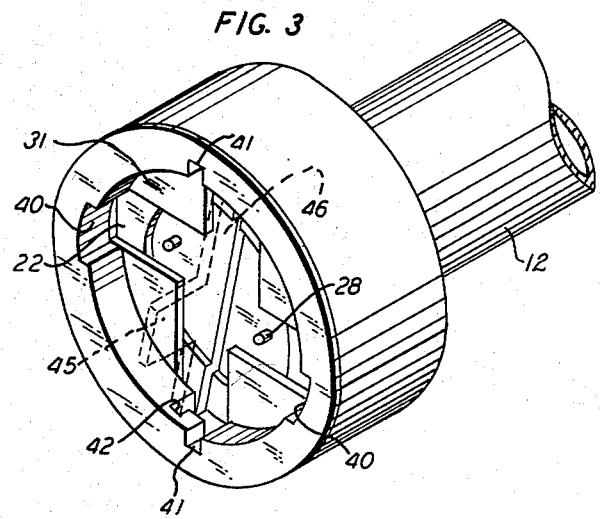
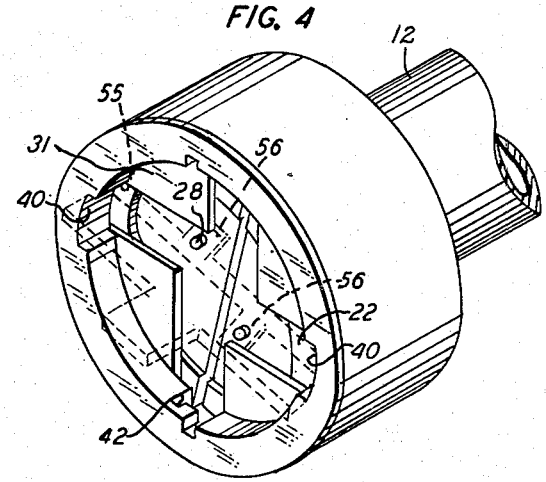
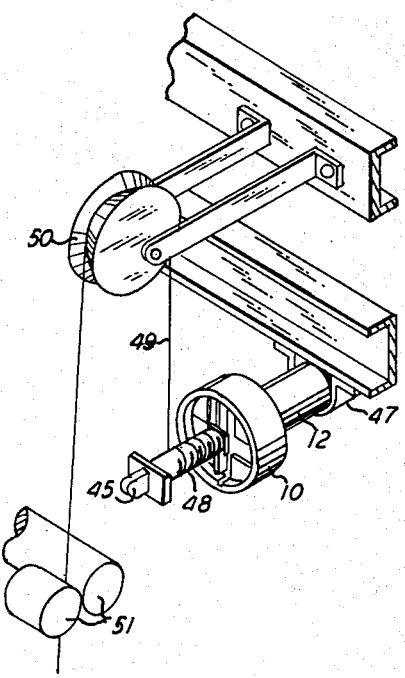
INVENTOR
C. A. FAUSEL
BY W. C. Parnell
ATTORNEY Patented Aug. 17, 1954

2,686,683

UNITED STATES PATENT OFFICE 2,686,683

QUICK-CHANGE ARBOR

Charles A. Fausel, Glen Ridge, N. J., assignor to Western Electric Company, Incorporated, New York, N. Y., a corporation of New York Application February 8, 1952, Serial No. 270,585

7 Claims. (Cl. 279—89)

1

This invention relates to chucks and more particularly to rotatable chucks for holding cores during unwinding of coils therefrom.

The different types of relays employed in the communication arts require different types of cores upon which the coils for the relays are wound. When the coils of the relays prove defective it is desirable to remove the coils without damaging the core. This can be done only by unwinding the coils. The different types of cores present problems of supporting them and rotating them about their center lines to unwind the wires from the coils.

An object of the present invention is a rotatable chuck which is simple in structure, readily actuable and capable of receiving various types of articles.

With this and other objects in view, the invention comprises a rotatable chuck in which an operator, by the use of only one hand may readily insert and remove an article. The chuck includes a housing mounted on a spindle with a retaining member therein apertured to receive an article, and a spring pressed element formed for interengagement with the article and movable about its axis and the axis of the spindle to cause clamping of portions of the article between the element and the retaining member. One of the important features of the chuck is the structure of the spring pressed element to receive and interengage different types of articles such as relay cores. The spindle, although normally free to rotate may be locked against rotation by axial movement thereof, during insertion or removal of the article. An additional locking means is interposed between the retaining member and the spring pressed element to lock the element in its loading and clamping positions.

Other objects and advantages will be apparent from the following detailed description when considered in conjunction with the accompanying drawings wherein:

Fig. 3 is a fragmentary isometric view of one end of the chuck illustrating the holding of one type of article.

Fig. 4 is a fragmentary isometric view of one end of the chuck illustrating the holding of another type of article, and Fig. 5 is a fragmentary isometric view of the chuck in operation during the winding of a coil on a core held thereby.

Figure 1:
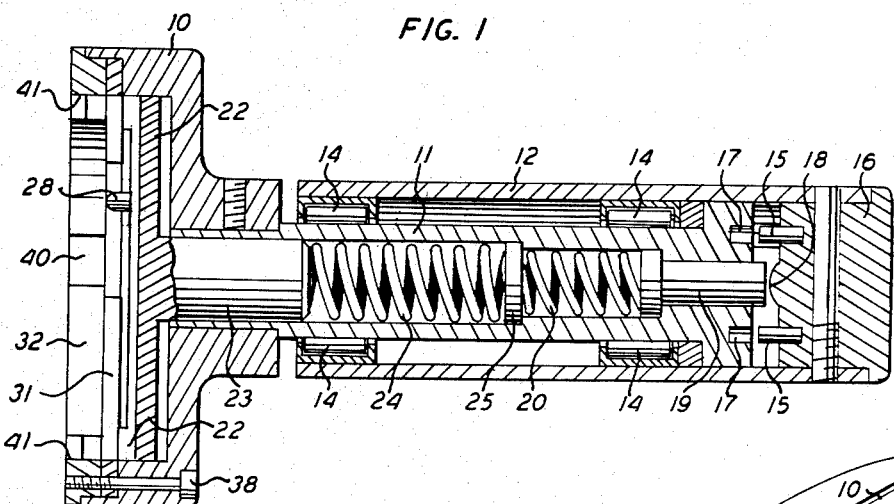
Fig. 1 is a longitudinal sectional view of the chuck.
Figure 2:
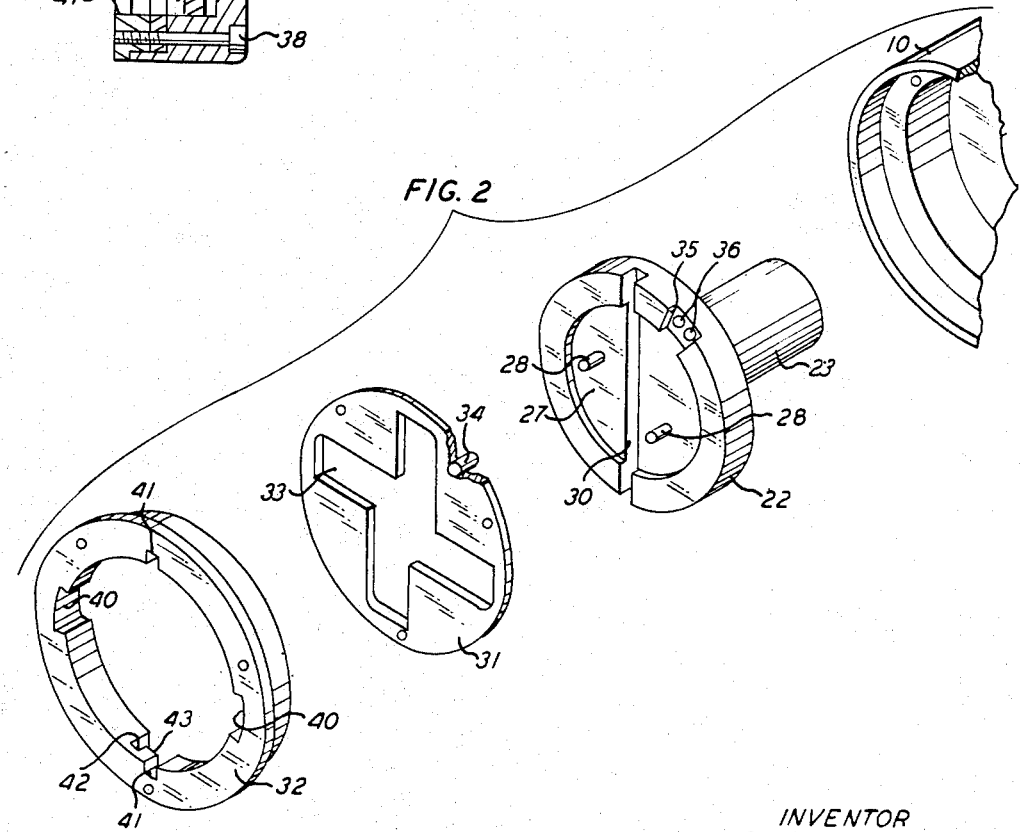
Fig. 2 is an exploded isometric view of portions of the chuck.

Referring now to the drawings, attention is first directed to Fig. 1 which illustrates the chuck as composed of a housing 10 mounted on one end of a hollow spindle 11 which extends into a sleeve-like support 12. Bearings 14 mounted in the sleeve 12 support the spindle 11 for free rotary and limited axial movement.

Means to temporarily lock the spindle against rotation include stationary pins 15 carried by a member 16 mounted in one end of the sleeve 12 and receivable in apertures 17 in the adjacent or inner end of the spindle 11. A central projection 18 is positioned to be engaged by a plunger 19 movable in the hollow spindle and normally urged toward the portion 18 by a spring 20. The spring pressed plunger 19 will keep the spindle free for rotation but when desired, the spindle may be locked against rotation by moving the housing 10 and the spindle axially.

A spring pressed element 22 is disposed in the housing 10 with its central projection 23 extending into the hollow spindle and engaging a spring 24 which is spaced from the spring 20 by a member 25. The element 22 has a depressed central portion 27 wherein retaining pins 28 are mounted equal distances from the center line of the element to interengage one type of article. A groove 30 extends diametrically through the element 22 to receive and interengage another type of article.

In the present embodiment of the invention, inner and outer retaining members 31 and 32 are shown as separate parts but if desired, they may be a single member. The inner retaining member 31 has a substantially cross shaped aperture 33 therein to receive ends of articles of various types and in one instance to cooperate with the element 22 to hold the article in a given position. A locking pin 34 carried by the inner retaining member 31 cooperates with the side walls of a groove 35 in the element 22 to act as stopping means to limit rocking movement of the element in either direction and to align either one of the apertures 36 with the pin and cooperate therewith to lock the element either in its loading position or its clamping position. The retaining members 31 and 32 are positioned in the housing 10 and mounted in place by means of screws 38 as shown in Fig. 1. The outer retaining member 32 includes diametrically opposed notches 40 for receiving one type of article and diametrically opposed notches 41 for receiving another type of article. The notches 40 and 41 are aligned with their respective ends of the aperture 33. Locking recesses 42, only one of which is shown in the drawing, are diametrically opposed and spaced from their respective notches 41 by reduced portions 43 to receive and firmly hold the end of one type of article.

In the present embodiment of the invention one type of article receivable by the chuck is a relay core 45 having a laterally extending end 46. The chuck is mounted at 47 for rotation to unwind a coil 48 of wire 49 passing over a pulley 50 and between guides 51 where the wire may be distributed in the conventional manner on a reel not shown. It will be apparent from this type of structure that the core is supported at only one end and in view of this fact it must be supported firmly with its center line in alignment with the axis of the chuck to accomplish satisfactory unwinding of the coil from the core.

To mount the core 45 in the chuck the operator need use only one hand in which he grips the coil wound core and guides the end 46 into the diametrically opposed grooves 41 and the groove 30 of the element 22. Continued movement of the core 45 will compress the spring 24 to move the element 22 to free it from its locking pin 34 and compress the spring 29 through the engagement of the plunger 19 with the portion 18 to lock the spindle by the pins 15 entering the apertures 17. The complete compression of the chuck locks the spindle against rotation and unlatches the element 22 so that rocking movement of the core 45 will move the end 46 thereof with the element 22 into the clamping position where the end 46 will be in alignment with the locking recesses 42. The inward movement of the element 22 positions the end 46 free of the notches 41 for movement past the portions 43 into registration with the recesses 42. When this has been accomplished the operator may release the article allowing the spring 24 to move the element 22 to cause the pin 34 to enter the proper recess 36 to lock the chuck with the core in the clamping position. At the same time the spring pressed plunger 19 will move the spindle 11 outwardly freeing it from its locking means 15—17, and the spring 24 will force the element against the end 46 to cooperate with the recesses in firmly holding the core in position for rotation about its axis.

The other type of core 55 has an end portion with apertured lugs 56 to receive the pins 28 by the aid of which the core may be interconnected with the element 22. To receive and firmly hold the core 55 in the chuck, substantially the same operations take place, the only difference being the direction of guiding the core 55 to the chuck so that its end portion will be aligned with the grooves 40 instead of the grooves 41. Certain shoulders of the grooves 40 serve when engaged by the end portion of the core 55 to align the apertures of the lugs 56 thereof with the pins 28. This type of core may be mounted in or removed from the chuck by the operator using only one hand to guide the end of the core into the grooves 40 to cause interengagement with the pins 28 and the apertured lugs after which continued force on the core will move the element to compress the spring 24 to free the pin 34 and will compress the plunger 19 to render the locking means 15—17 effective to hold the spindle temporarily against rotation. At this time rocking movement of the article will move the element 22 from the loading position to the clamping position, at which time, the lugs 56 will extend beneath adjacent portions of the inner retaining member 31, firmly clamping the core, when released, with its center line in alignment with the axis of the core. Either core may be released from the chuck after the coil has been wound thereon by reversing the action taken in positioning the cores in clamping position. In other words, the core mounted in the chuck is forced in a direction to compress the springs 24 and 29 to release the locking means 34—36 and to render effective the locking means 15—17, at which time, the core may be rocked to move the element 22 into its loading position where it will free the core.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A rotatable chuck comprising a housing, a rotatable spindle to support the housing, a retaining member mounted in the housing and apertured to receive an article, an element normally disposed in a loading position in the housing, movable about its axis which is coincident with the axis of the spindle into a clamping position and normally urged toward the retaining member, means carried by the element for interengagement with an article whereby the element may be moved axially away from the retaining member and about its axis from the loading position to cause clamping of a portion of the article between the element and the retaining member and means to lock the element in the loading and clamping positions releasable by movement of the element away from the retaining member.

2. A rotatable chuck comprising a housing, a rotatable spindle to support the housing, a retaining member mounted in the housing and apertured to receive an article, an element normally disposed in a loading position in the housing, movable about its axis which is coincident with the axis of the spindle into a clamping position and normally urged toward the retaining member, the element having a groove therein to receive a portion of the article at the loading position and whereby axial and rotary movement of the article will move the element to the clamping position, the retaining element having a groove positioned to receive a portion of the article when in the clamping position to cooperate with the groove of the element to hold the article in a given position relative to the axis of the spindle.

3. A rotatable chuck comprising a housing, a rotatable spindle to support the housing, a retaining member mounted in the housing and apertured to receive an apertured portion of an article, an element normally disposed in a loading position in the housing, movable about its axis which is coincident with the axis of the spindle into a clamping position and normally urged toward the retaining member, pins mounted on the element at spaced positions adapted to be received in the apertures of the article whereby the element may be moved into clamping position by axial and rotary movement of the article.

4. A rotatable chuck comprising a housing, a rotatable spindle to support the housing, a retaining member mounted in the housing and apertured to receive an article, a spring pressed element disposed in the housing, formed for interengagement with the article and movable about the axis of the spindle to cause clamping of portions of the article between the element and the retaining member and means actuable to lock the spindle against rotation whereby the element may be moved into and out of clamping position.

5. A rotatable chuck comprising a housing, a rotatable spindle to support the housing, a retaining member mounted in the housing and apertured to receive an article, an element normally disposed in a loading position in the housing, movable about its axis which is coincident with the axis of the spindle into a clamping position and normally urged toward the retaining member, means actuable to latch the spindle against rotation, and means carried by the element for interengagement with an article whereby the element may be moved axially away from the retaining member and about its axis from the loading position to cause clamping of a portion of the article between the element and the retaining member when the spindle is latched against rotation.

6. A rotatable chuck comprising a housing, a rotatable spindle to support the housing, means to support the spindle for axial and rotary movement, means actuable to lock the spindle against rotation, a retaining member mounted in the housing and apertured to receive an article, an element formed for interengagement with the article and rockable about the axis of the spindle between a loading position and a clamping position when the spindle is locked against rotation, means serving to locate the element in either position and means associated with the said locating means to lock the element in either position.

7. A rotatable chuck comprising a housing, a rotatable spindle to support the housing, means to support the spindle for axial and rotary movement, means actuable to lock the spindle against rotation, a retaining member mounted in the housing and apertured to receive an article, an element formed for interengagement with the article and rockable about the axis of the spindle between a loading position and a clamping position when the spindle is locked against rotation, means serving to locate the element in either position, means associated with the said locating means to lock the element in either position and means, normally urging the locking means for the spindle unlocked and the locking means for the element locked, compressible by movement of the article through the retaining member and against the element to lock the element and unlock the spindle for movement from one position to another.

References Cited in the file of this patent

UNITED STATES PATENTS

| Number | Name | Date |
|---|---|---|
| 1,413,101 | Cushing | Apr. 18, 1922 |
| 1,588,281 | Styron | June 8, 1926 |
| 1,661,935 | Fegley et al. | Mar. 6, 1928 |
| 1,768,219 | Smith | June 24, 1930 |
| 2,356,245 | Johnston | Aug. 22, 1944 |
| 2,437,309 | Veatch | Mar. 9, 1948 |
| 2,548,534 | Hutchison, Jr. | Apr. 10, 1951 |